United States Patent
Lindenmeier et al.

(10) Patent No.: US 6,400,334 B1
(45) Date of Patent: Jun. 4, 2002

(54) DIVERSITY ANTENNA SYSTEM FOR A MOTOR VEHICLE

(75) Inventors: Heinz Lindenmeier, Planegg; Jochen Hopf, Haar; Rainer Kronberger, Höhenkirchen; Leopold Reiter, Gilching, all of (DE)

(73) Assignee: FUBA Automotive GmbH & Co. KG, Bad Salzdetfurth (DE)

( * ) Notice: Subject to any disclaimer, the term of this patent is extended or adjusted under 35 U.S.C. 154(b) by 0 days.

(21) Appl. No.: 09/635,960

(22) Filed: Aug. 10, 2000

(30) Foreign Application Priority Data

Aug. 11, 1999 (DE) .......................................... 199 38 020

(51) Int. Cl.$^7$ ................................................. H01Q 1/50
(52) U.S. Cl. ...................................... 343/850; 343/711
(58) Field of Search ................................. 343/711, 712, 343/713, 704, 720, 850, 852, 749; H01Q 1/32, 1/50

(56) References Cited

U.S. PATENT DOCUMENTS

| | | | | |
|---|---|---|---|---|
| 4,070,677 A | * | 1/1978 | Meinke et al. .............. | 343/704 |
| 4,864,316 A | * | 9/1989 | Kaoru et al. ................ | 343/704 |
| 4,914,446 A | | 4/1990 | Lindenmeier et al. ...... | 343/704 |
| 5,097,270 A | | 3/1992 | Lindenmeier et al. ...... | 343/704 |
| 5,610,618 A | * | 3/1997 | Adrian et al. ............... | 343/713 |
| 5,801,663 A | | 9/1998 | Lindenmeier et al. ...... | 343/704 |

FOREIGN PATENT DOCUMENTS

| | | |
|---|---|---|
| DE | 37 19 692 | 12/1988 |
| DE | 36 19 704 | 9/1991 |
| EP | 0 297 328 | 6/1988 |

* cited by examiner

Primary Examiner—Don Wong
Assistant Examiner—Trinh Vo Dinh
(74) Attorney, Agent, or Firm—Collard & Roe, P.C.

(57) ABSTRACT

An antenna for a diversity antenna system in a vehicle for mounting within the zone of a window pane surrounded by the electrically conductive body of the vehicle, consisting of a rear window pane having a substantially rectangularly or trapezoidally shaped surface and electrically conductors applied to the surface. A conductive surface in terms of high frequency, and coherent with respect to its edge conductors (12) is formed within the rear window pane. The edge conductors (12) are insulated at high frequencies from the vehicle ground so that each edge conductor (12) of a side of the conductive surface (1) has a minimum length of about $\lambda/10$. At least one zone of the edge conductors (12) is provided in the form of a low-resistance coupling conductor (12a) with a continuous minimum length of about $\lambda/10$. The antenna, formed out of the conductive surface, has a pair of terminals with a vehicle ground connection point (2) and an antenna connection point (5) on one of the low-resistance coupling conductors (12a). The pair of terminals is connected to a connection network (4). Furthermore, at least one electronically controllable impedance network (6) is provided, and an impedance connection point (8) is formed, which is coupled to the antenna connection point (5) via the low-resistance coupling conductor (12a). The antenna is coupled to a radio receiver and a rectangular window pane of an automobile serving a dual purpose in also providing a heating to the window.

33 Claims, 11 Drawing Sheets

US 6,400,334 B1

DIVERSITY ANTENNA SYSTEM FOR A MOTOR VEHICLE

FIELD OF THE INVENTION

The invention relates to a diversity antenna in the metric and decimetric wave ranges for motor vehicles.

PRIOR ART

The invention is a multi-antenna system of the type used for providing an antenna diversity system. Such multi-antenna systems are described in European Patent EP 0 269 723, German Patents DE 37 19 692 and 36 19 704, and U.S. Pat. Nos. 4,914,446 and 5,801,663 which employ different types of antennas such as rod aerials, windshield pane antennas or the like. When there is adequate decoupling of the antennas in terms of high frequency, reception interference occurs as the motor vehicle moves through different locations in the field of reception. This reception interference takes results from temporary fading of the reception level because of the multi-way propagation of the electromagnetic waves. The function of an antenna diversity system is to switch from one antenna to another when reception interference occurs in the signal of the operating antenna, as well as to minimize signal loss (or level fading) on the receiver input leading to reception interference within a defined field of reception.

According to the prior art, four antenna amplifiers are used for receiving VHF radio signals. The antenna amplifiers are installed on the edge of a rear window glass pane. The wiring of such antenna amplifiers requires substantial expenditure, which is frequently viewed as intricate in the automaking industry as well.

Signal loss or level fading plotted over the driving distance, and over time occurs incongruently. The likelihood of having an undisturbed signal among the available antennas increases with the number of available antennas and with decoupling between the signals of the antennas in terms of diversity. Decoupling of the antenna signals in terms of diversity exists when the reception signals are different particularly in view of reception interference such as, fading of the HF signal level.

SUMMARY OF THE INVENTION

An object of the invention is to design an improved. diversity antenna for a diversity antenna system in a motor vehicle. The antennas receive signals which can be selected in different ways with only one antenna connection, whereby the average reception quality is as good as possible and the reception interference occurring simultaneously in the various antenna signals while the vehicle is moving is similarly low as with separated antennas.

The present invention is in part based on European Patent EP 0 269 723. The use of at least two antennas is required for obtaining antenna signals that are decoupled in terms of diversity. These antennas have to be created from the heating field of a motor vehicle. It is necessary to provide each antenna for a connection network with an antenna amplifier to obtain good signal/noise ratios. These connection networks require a great expenditure, especially in conjunction with the required high-frequency connection lines.

BRIEF DESCRIPTION OF THE DRAWINGS

Other objects and features of the present invention will become apparent from the following detailed description considered in connection with the accompanying drawings.

It is to be understood, however, that the drawings are designed as an illustration only and not as a definition of the limits of the invention.

In the drawings, wherein similar reference characters denote similar elements throughout the several views:

FIG. 1a shows a diversity antenna for a diversity antenna system in a motor vehicle according to the invention;

FIG. 1b shows a diversity antenna with a low-resistance coupling conductor on a glass pane;

FIG. 1c is a graph showing the received voltage on the antenna connection point of the antenna;

FIG. 2 shows a diversity antenna with a low-resistance coupling conductor;

Figure 3A:
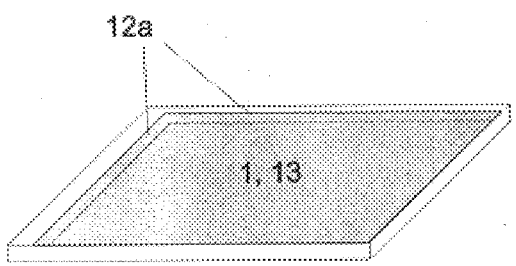
Figure 4:
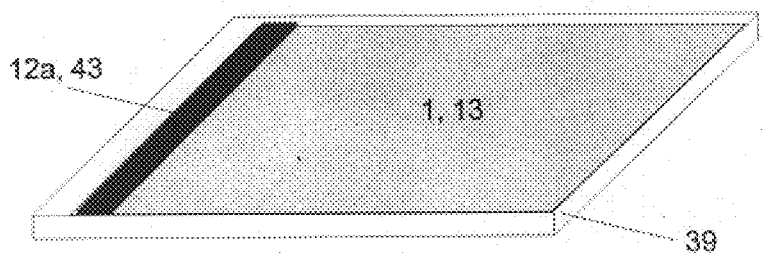
Figure 5:
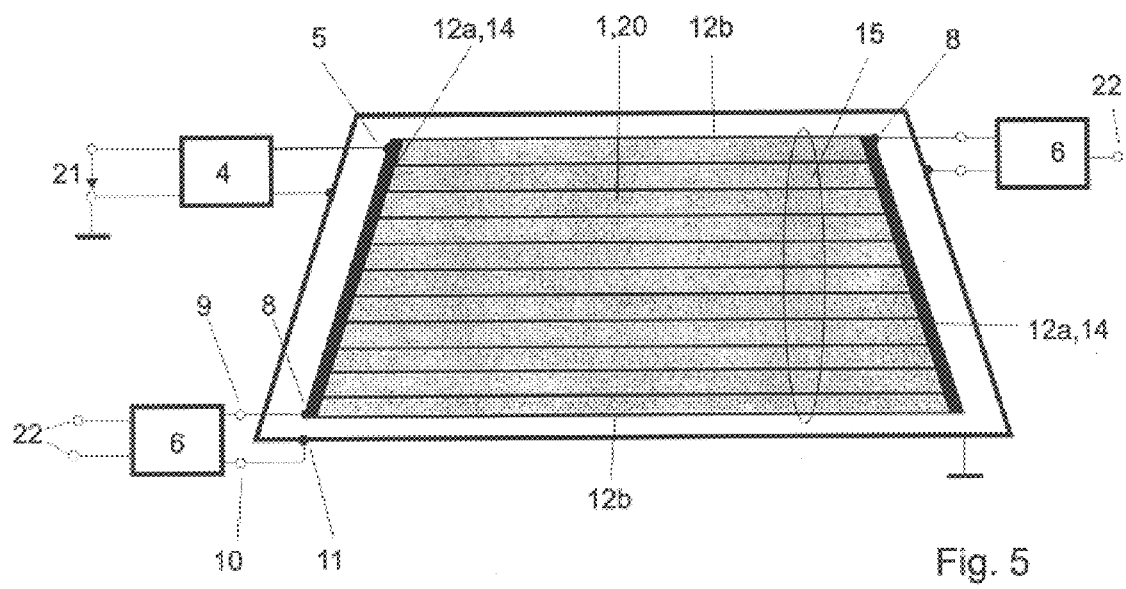
Figure 6:
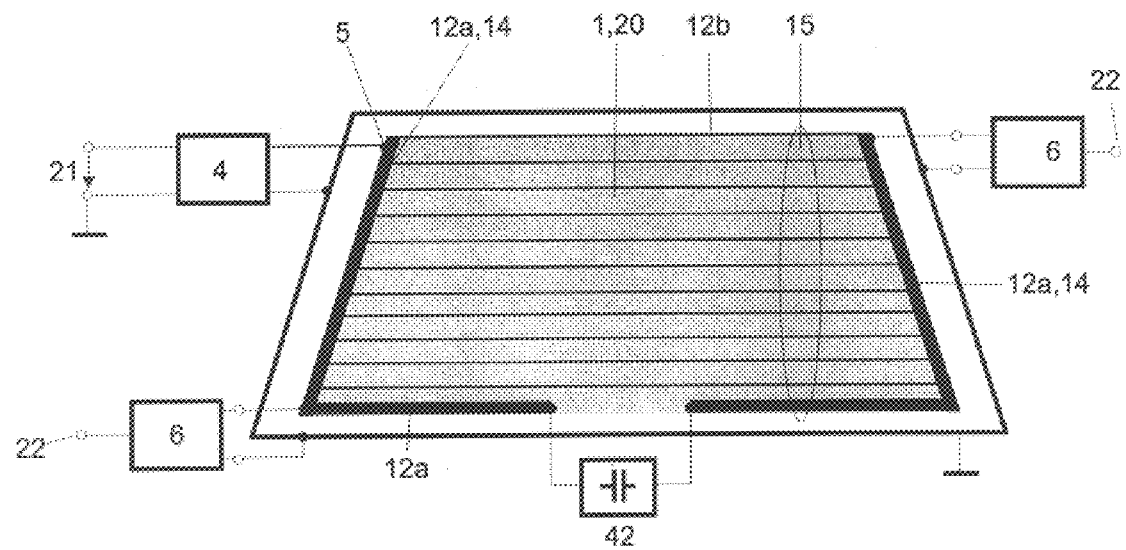
Figure 7:
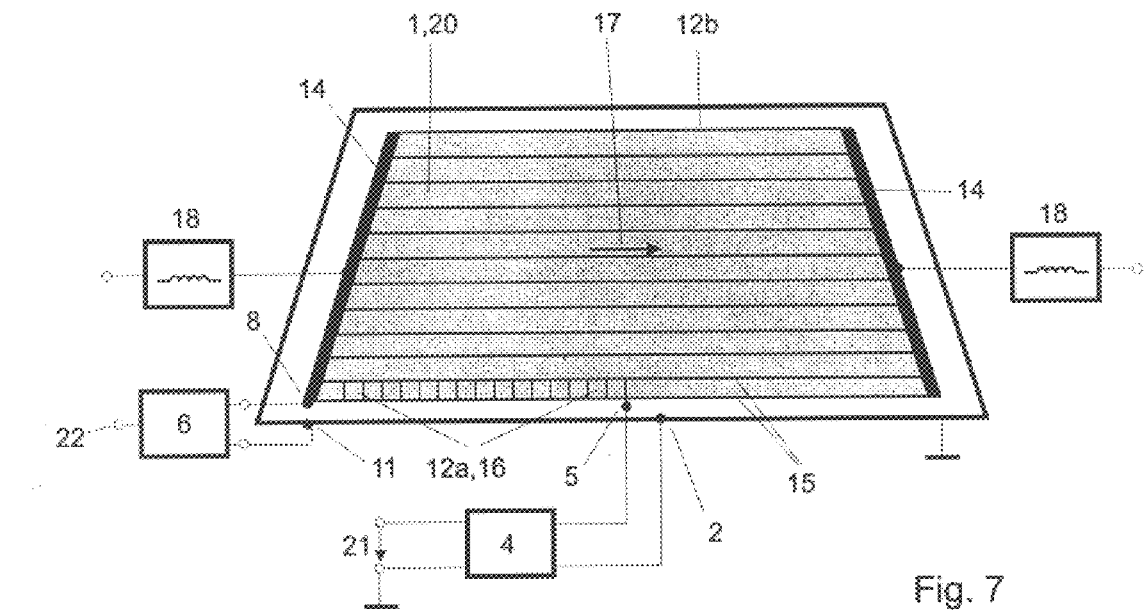
Figure 8:
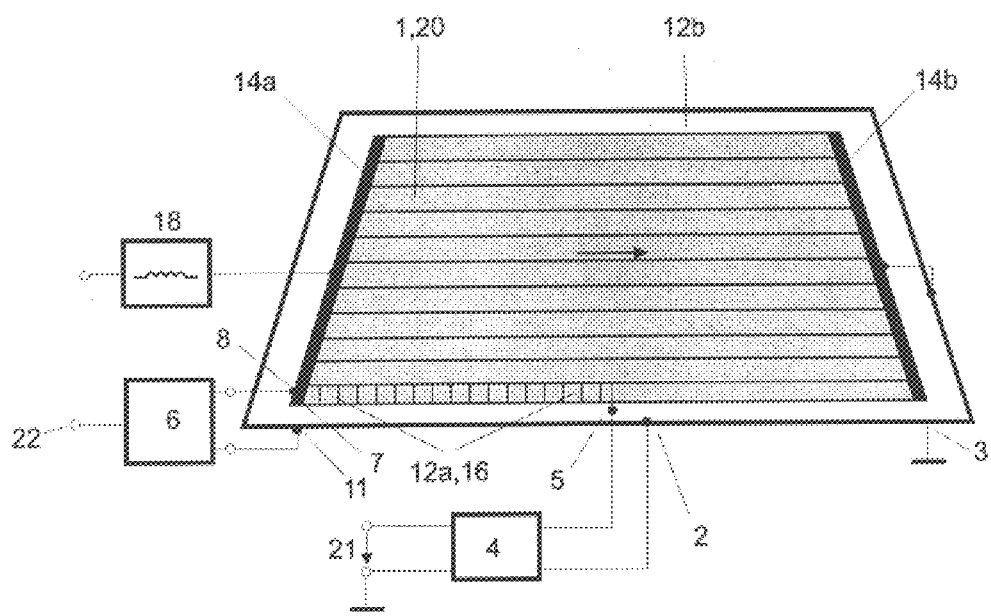
Figure 9:
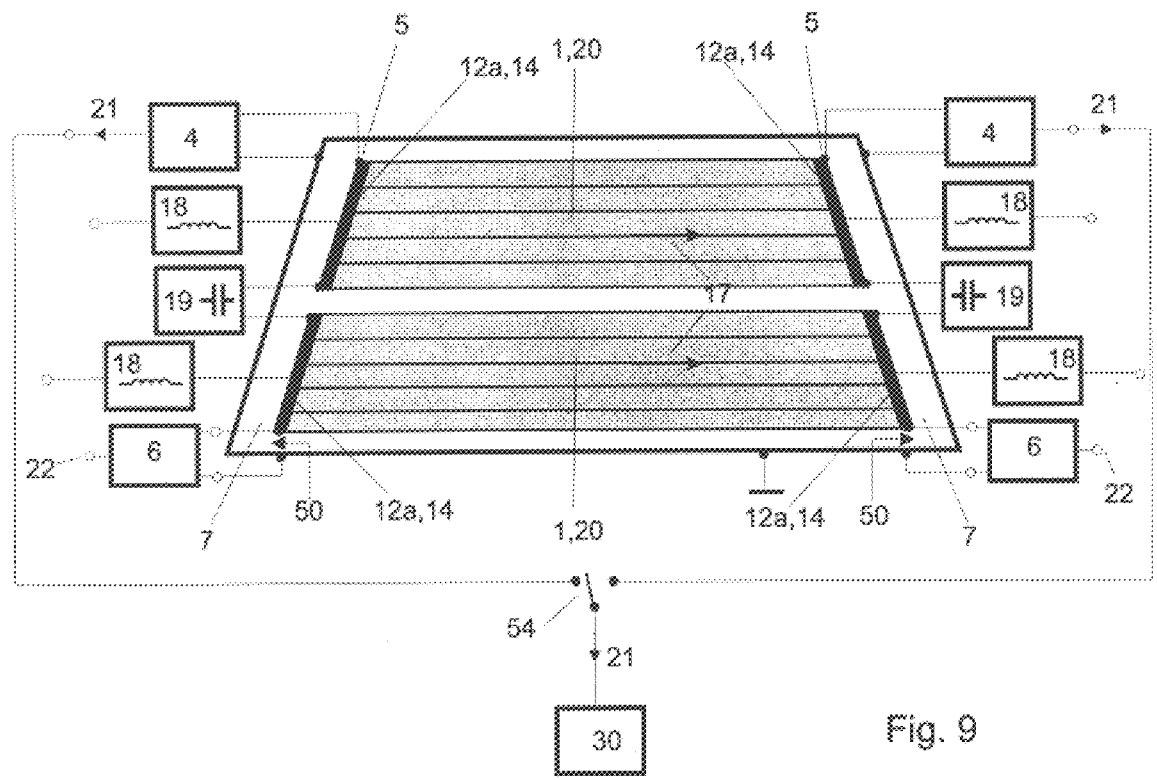
Figure 10:
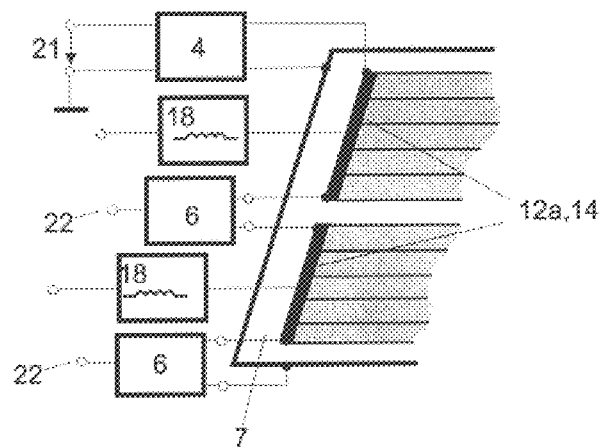
Figure 11A:
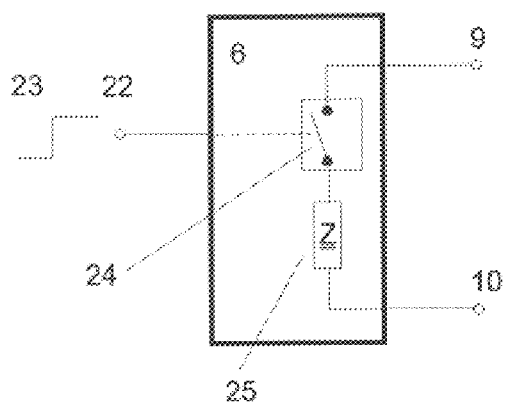
Figure 11B:
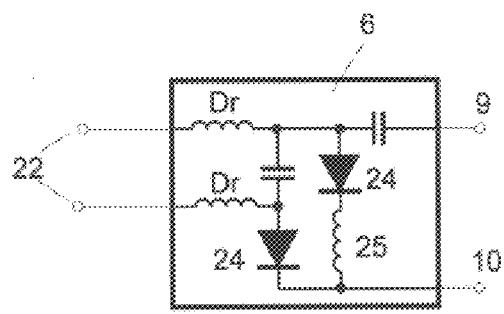
Figure 12A:
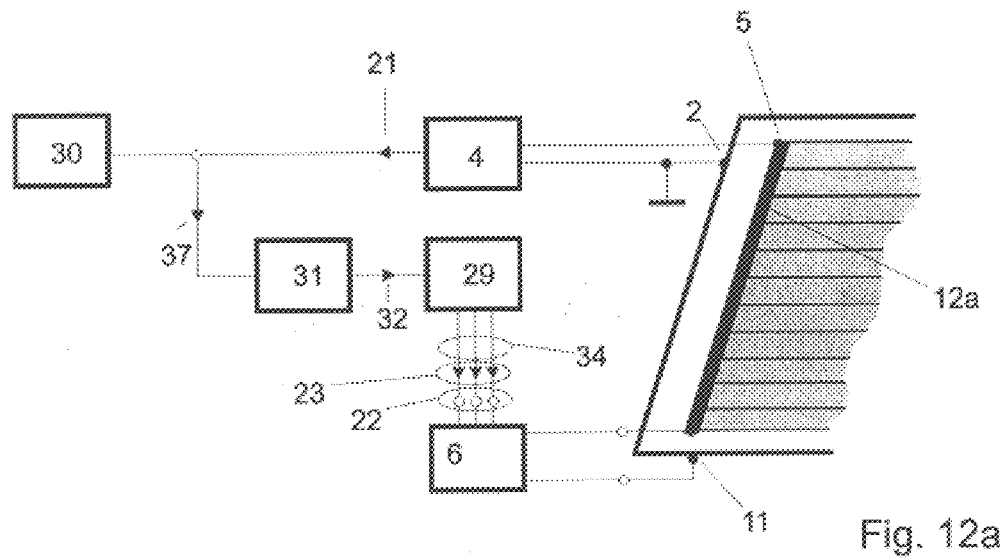
Figure 12B:
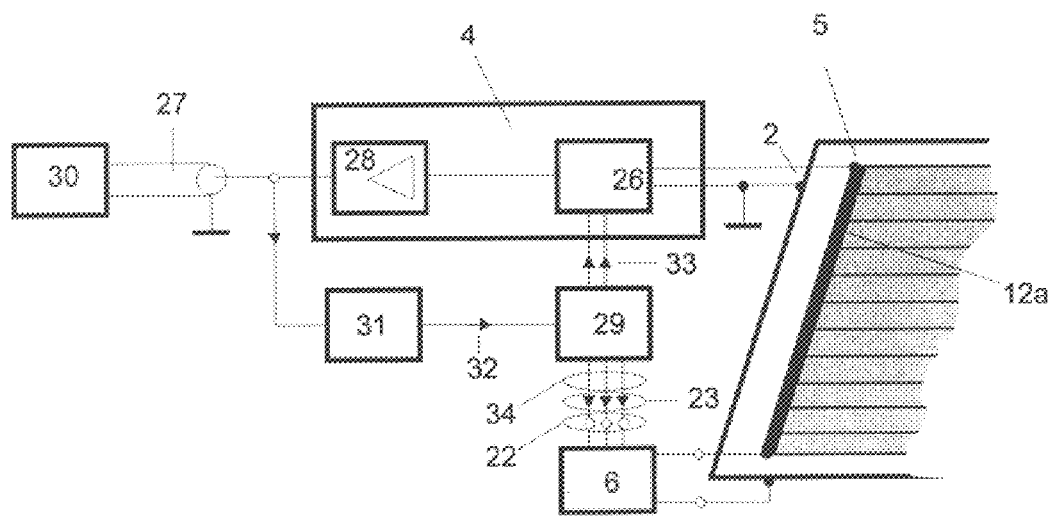
Figure 13:
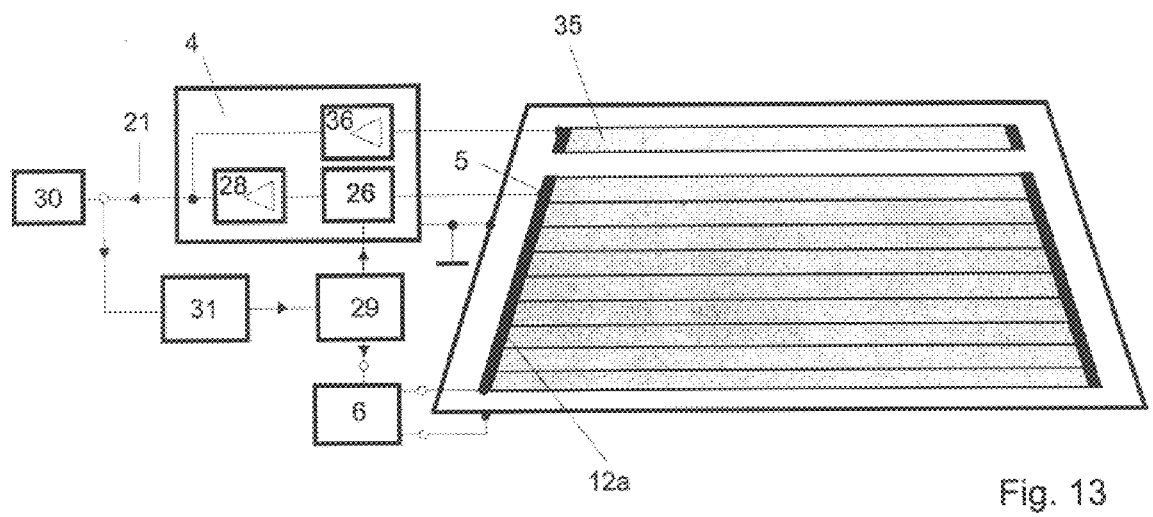
Figure 14:
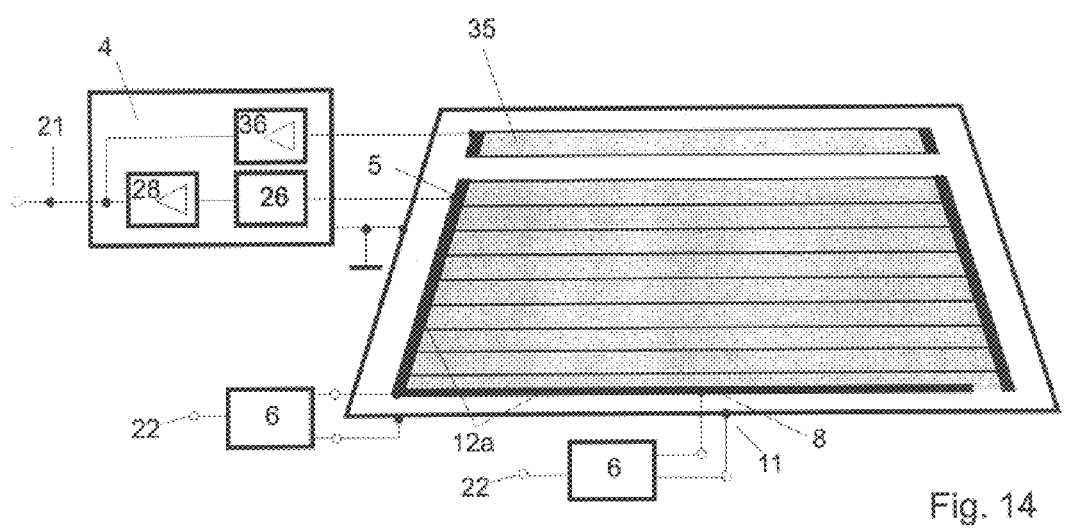
Figure 15:
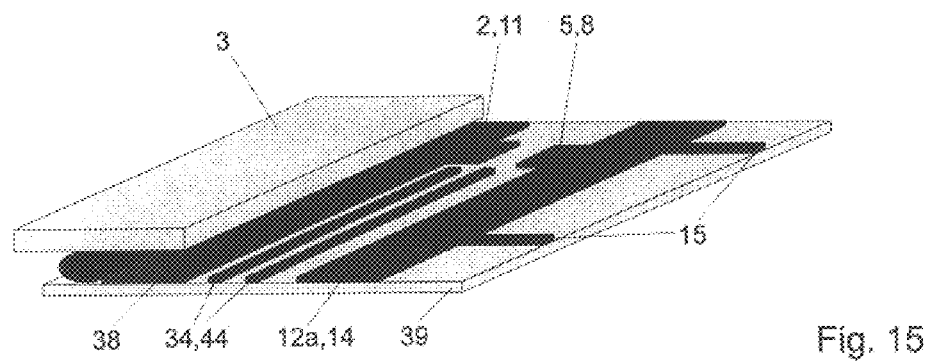
Figure 16:
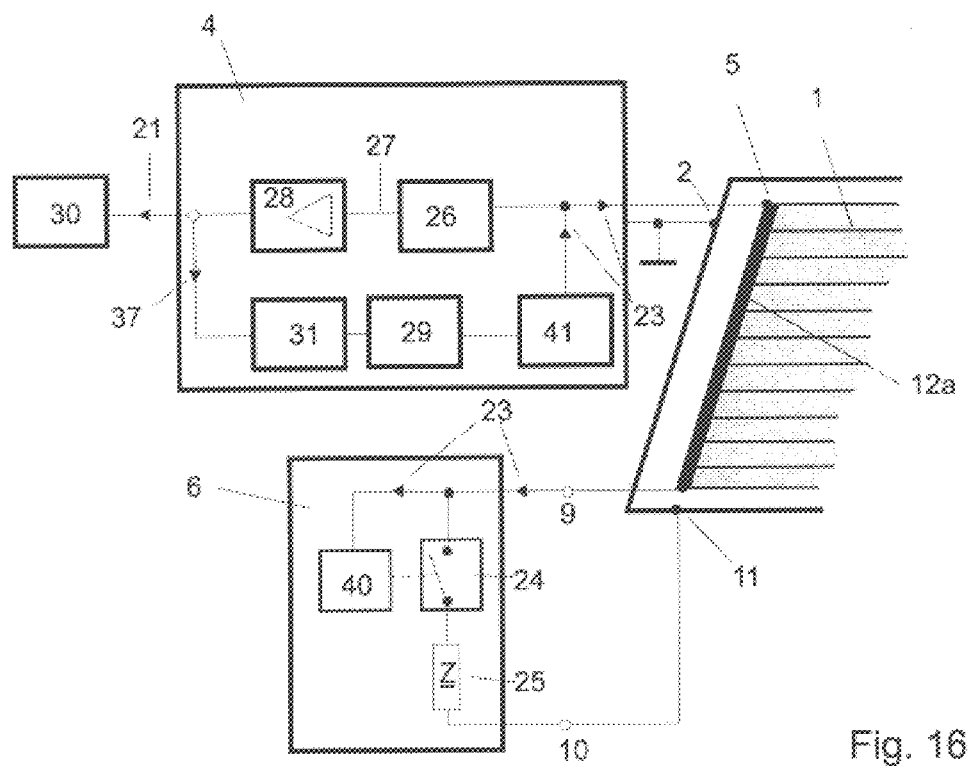
Figure 17:
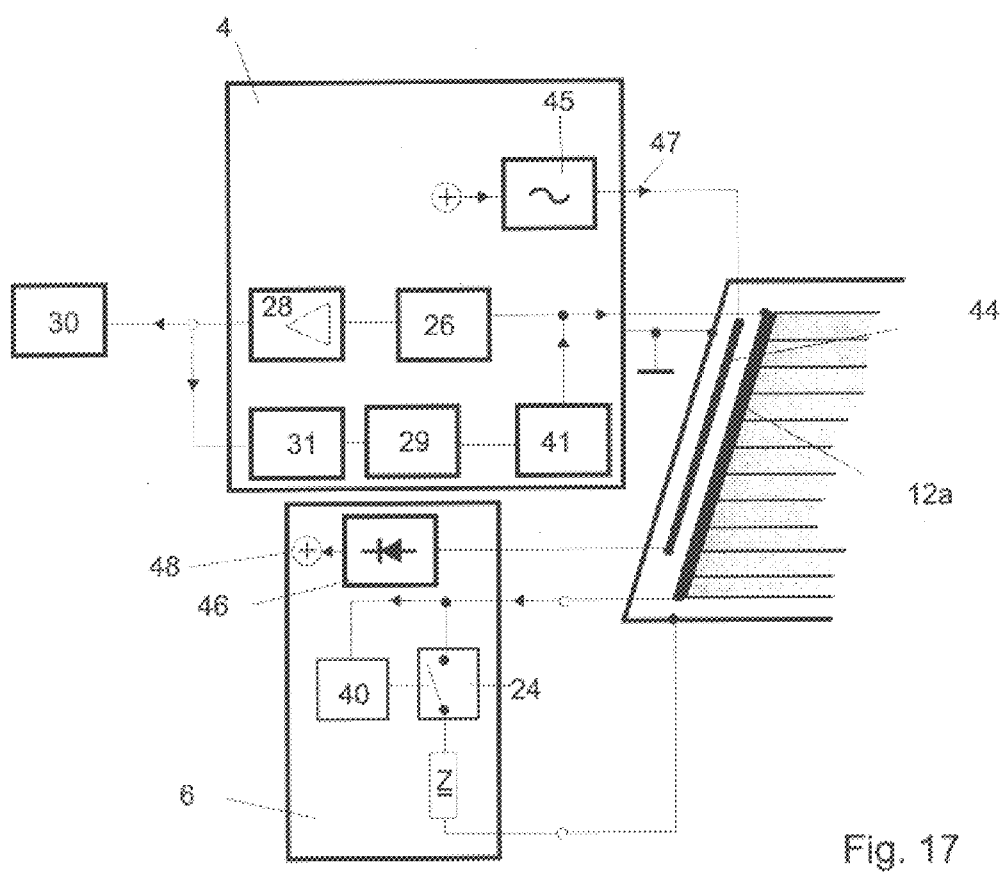
Figure 18:
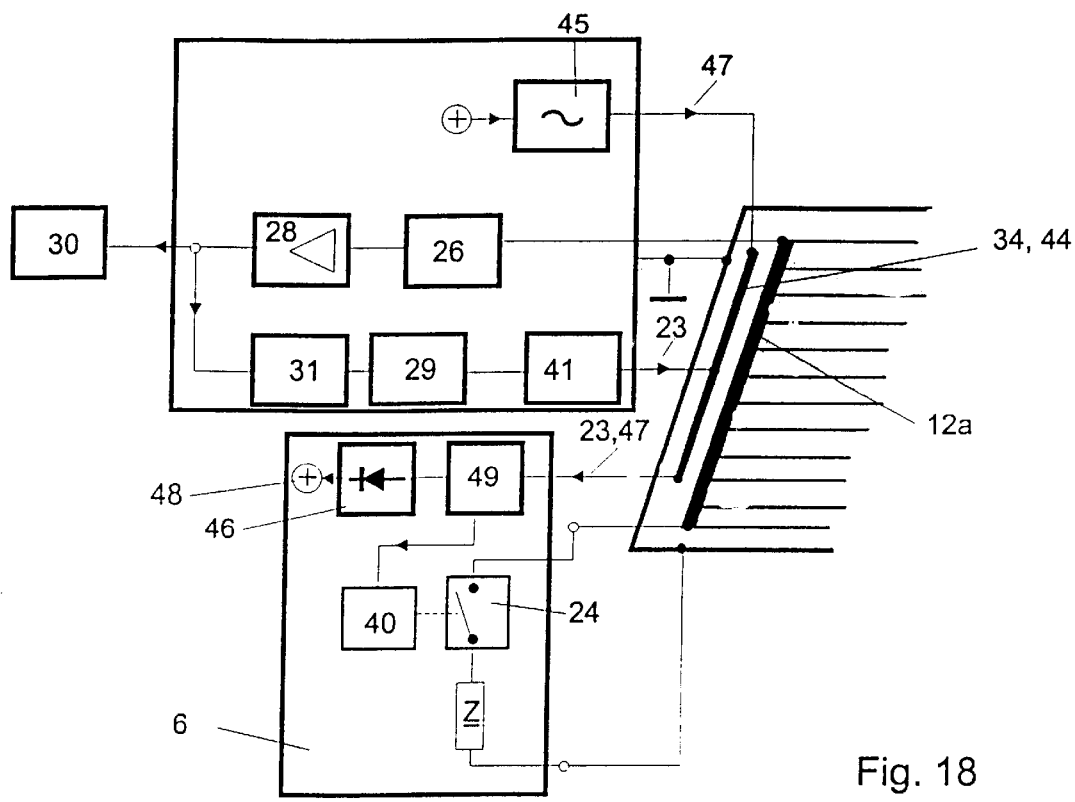
Figure 19:
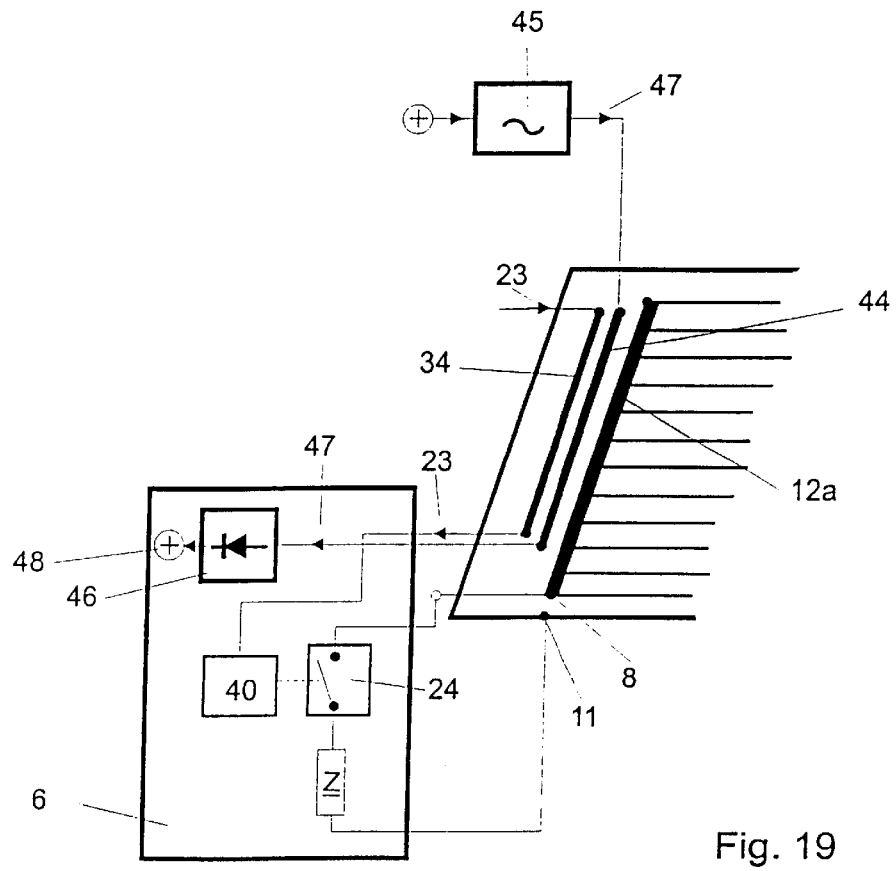
Figure 20:
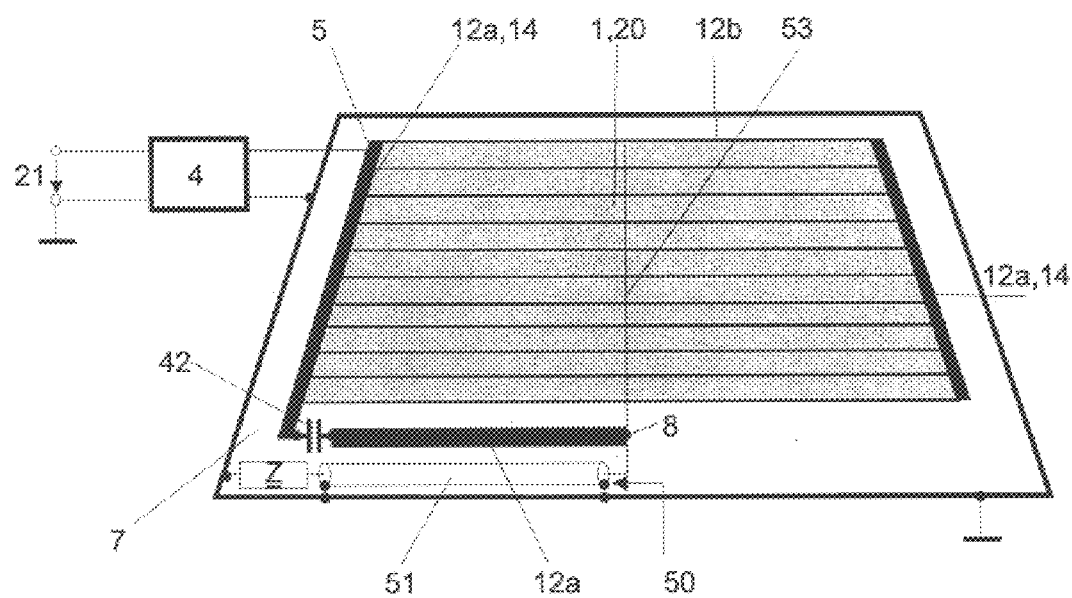
Figure 21:
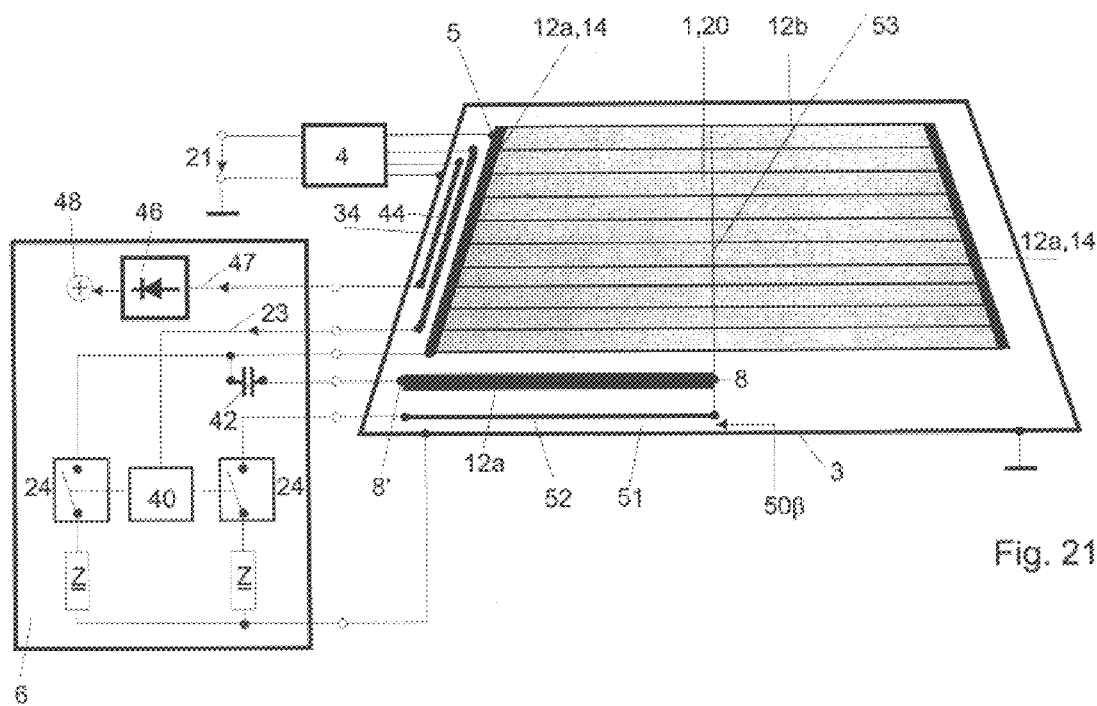

FIGS. 3a and b show the glass pane with a conductive coating;

FIG. 4 shows the low-resistance coupling conductor in the form of a strip-like electrode,;

FIG. 5 shows the conductive surface of the antenna formed by the conductor arrangement of a rear-window heating system in a motor vehicle;

FIG. 6 shows a low-resistance coupling conductor as the lower edge conductor of the conductive surface;

FIG. 7 shows the heating field with feed networks on the bus-bars blocking HF-currents;

FIG. 8 shows the embodiment of FIG. 7 with a heating current feed line directly connected to the vehicle ground on the bus-bar;

FIG. 9 shows a vehicle window with partial heating fields at the top and bottom;

FIG. 10 shows an impedance network with the switching control input connected between the top and bottom bus-bars of the antenna;

FIG. 11a shows an impedance network with HF connections;

FIG. 11b shows an impedance network with control gates, and with HF switching diodes serving as electronic switching elements;

FIG. 12a shows a diversity receiving system with a diversity processor and a switching device which controls the control gates of the electronically controllable impedance networks via the control lines;

FIG. 12b shows a diversity receiving system with a diversity processor and a switching device 29 controls the control gates of the electronically controllable impedance networks via the control lines 34, and controls a digitally switchable adapter network in the connection network via the switching signals;

FIG. 13 shows the diversity antenna system, with an additional AM antenna conductor for receiving AM radio signals;

FIG. 14 shows the embodiment in FIG. 13 with an additional electronically controllable impedance network;

FIG. 15 shows a strip-like conductor applied to the surface of the glass window pane;

FIG. 16 shows an antenna system having a code generator disposed in the connection network;

FIG. 17 shows a system having a means for generating a ac supply voltage using an inverter contained in the connection network;

FIG. 18 shows a single conductor imprinted on the window pane that serves as both the control line and the current supply line for the electronically controllable impedance network;

FIG. 19 is an electrical block diagram of an electronically controllable impedance network;

FIG. 20 shows the spatial separation of the electronically controllable impedance network; and FIG. 21 shows the system of FIG. 20, with the high-frequency line as a printed conductor.

DETAILED DESCRIPTION OF THE PREFERRED EMBODIMENT

Figure 1A:
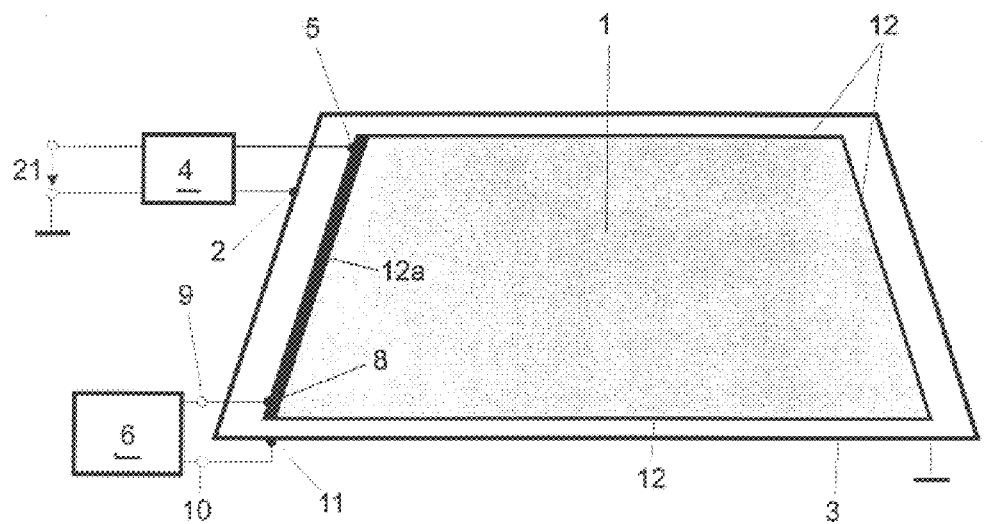

Referring now in detail to the drawings and, in particular to FIG. 1a, there is a diversity antenna system comprising a low-resistance coupling conductor 12a connected to a homogeneously disposed conductive surface 1. The surface resistance of conductive surface 1 can be about 50 ohms because of its capacitive effect. An antenna connection point 5 with a vehicle ground connection point 2, which is later referred to as gate I is located at one end of low-resistance coupling conductor 12a. Impedance connection point 8 with an adjacent vehicle ground point 11 referred to as gate II, is formed at the other end of low-resistance coupling conductor 12a. Because of the dimension of low-resistance coupling conductor 12a having a minimum length of $\lambda/10$, as well as of conductive surface 1, this dimension is effective as compared to the wavelength when a multitude of electromagnetic waves arrive. Different signal levels will develop in the statistical wave field on the two gates with a preset impedance load if the gates are provided with an adequately large spacing in comparison to the wavelength.

Figure 1B:
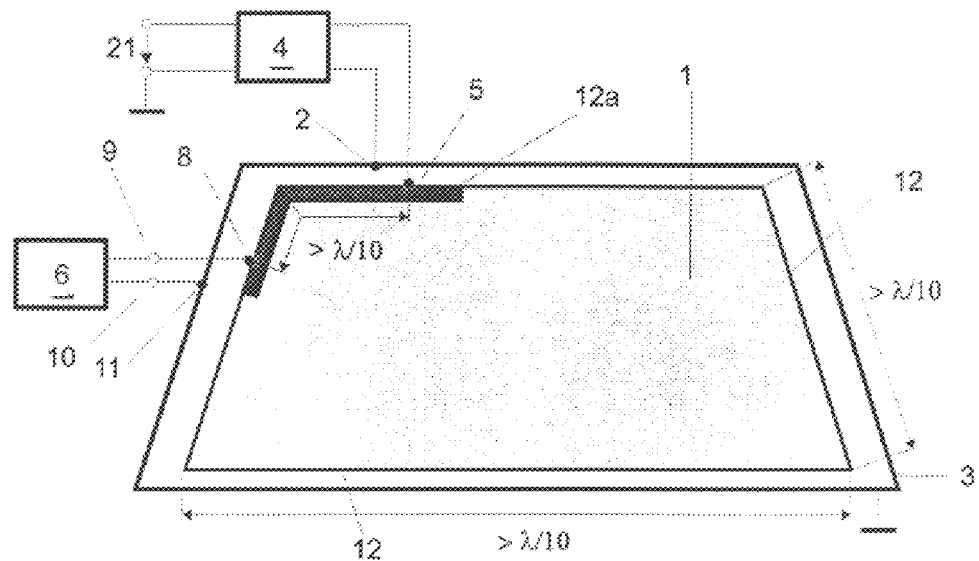

When wave parameters are used for describing the antenna, where $S_{11}$ and $S_{22}$ are the input reflection factors on gates I and II, respectively, $S_{12}$ is designated as the coupling on these gates, and on gate I the complex voltage contribution $\underline{U}_v * S_{13}(\phi_v)$ to a V-nth wave falling from the azimuthal direction $\phi_v$ with the complex amplitude $W_v$, starting from a fictitious gate III, and to its voltage contribution on gate II $\underline{U}_v \times S_{23}(\phi_v)$ accordingly, it is possible with preset impedance terminations of gates I and II to specify the received voltage on the gates in one location. Assuming that "N" of these waves are superposed with statistically distributed complex amplitudes, which fall in at statistically distributed azimuthal angles $\phi_v$, and under the simplified assumption of a reflection-free termination of gate I, with $r_1=0$, and of the termination of gate II with the reflection factor $r_2$ ($Z_2$), it is possible to express the received voltage $\underline{U}_1$ (l) developing on gate I over the driving distance l. With the simplifying presupposition of a reflection-free termination ($r_1=0$) on gate I, e.g. through termination with a connection network 4 whose input impedance corresponds to the reference impedance of wave parameter system, it is possible to describe the received voltage $\underline{U}_1$ (l) on the connection network 4 over the driving distance l as follows:

tion in that a sufficiently large spacing of at least $\lambda/10$ is required between the two gates (see FIG. 1b). If the input reflection factor $S_{22}=0$, which is not required in the invention, the above relation provides a simpler description of the voltage level on gate I as follows:

$$\underline{U}_I(l,r_2) = \underline{U}_1(l) + S_{12}(A) \cdot r_2(Z_2) \cdot \underline{U}_{11}(l) \qquad (2)$$

Figure 1C:
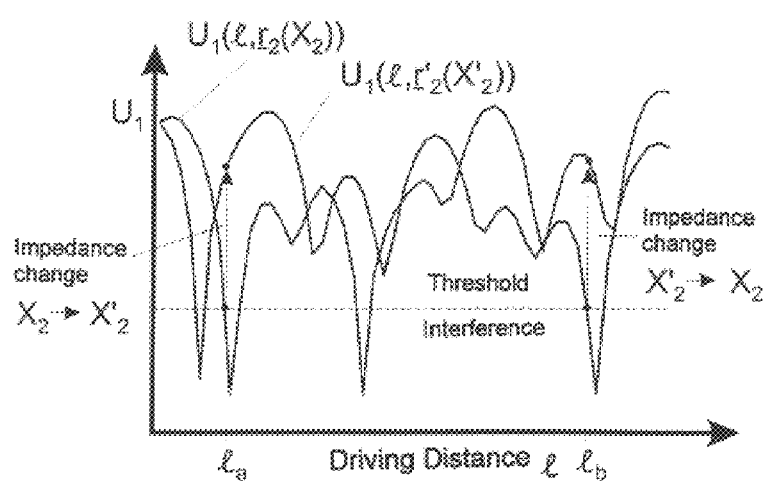

This description clearly shows that the received voltage $\underline{U}_I(l,r_2)$ can be different from zero only if $\underline{U}_I(l)$ and $\underline{U}_{II}(l)$ are not zero in the same location of the driving distance, or have a level fading. This sets up an adequate difference between $S_{13}(\phi v)$ and $S_{23}(\phi v)$. The coupling parameter $S_{12}$ is fixed by the selection of gates I and II, and by coupling conductor 12a. However, the reflection factor $r_2(Z_2)$ may assume within the complex plane, all values by providing different impedances $Z_2$ within the unit circle. Therefore, reactance values $Z_2=jX_2$ with $|r_2|=1$, are to be preferred to receive signals with high output. If, with the termination of gate II with a defined value $X_2$, level fading occurs for $\underline{U}_1(l)$ as shown in FIG. 1c. This deficiency can be eliminated by switching the impedance $Z_2$ to another suitable value $X_2$ if the amount of the coupling parameter $S_{12}$ is adequately large. Sufficient coupling is achieved in connection with the present invention by the coupling conductor 12a. If the coupling is too small, meaning that the contribution to the received voltage originating from the expression $\underline{U}_{II}(l)$ is too small, and level fading is not completely eliminated when switching from $X_2$ to $X_2$ even with optimal selection of these reactances, then it is not possible to achieve the desired decoupling of the two antenna signals in terms of diversity.

FIG. 1c shows the basic mode of operation of a diversity antenna system with an antenna as defined by the invention. If, l<la, the signal level $U_1(l,r_2(X_2))$ is effective in the receiver first, the diversity processor, if the reception level falls short of the interference threshold in driving distance location $l_a$, will switch in on gate II a changed impedance $Z_2=jX_2'$, with a correspondingly changed reflection factor $r_2$ ($X_2'$). Therefore, the signal $U_1(l,r'_2 (X_2'))$ is effective in the receiver after the change-over until switching takes place again in vehicle location is to the original impedance value $Z_2=jX_2'$ with the signal level $U_1(l,r_2(X_2))$, etc.

Figure 2:
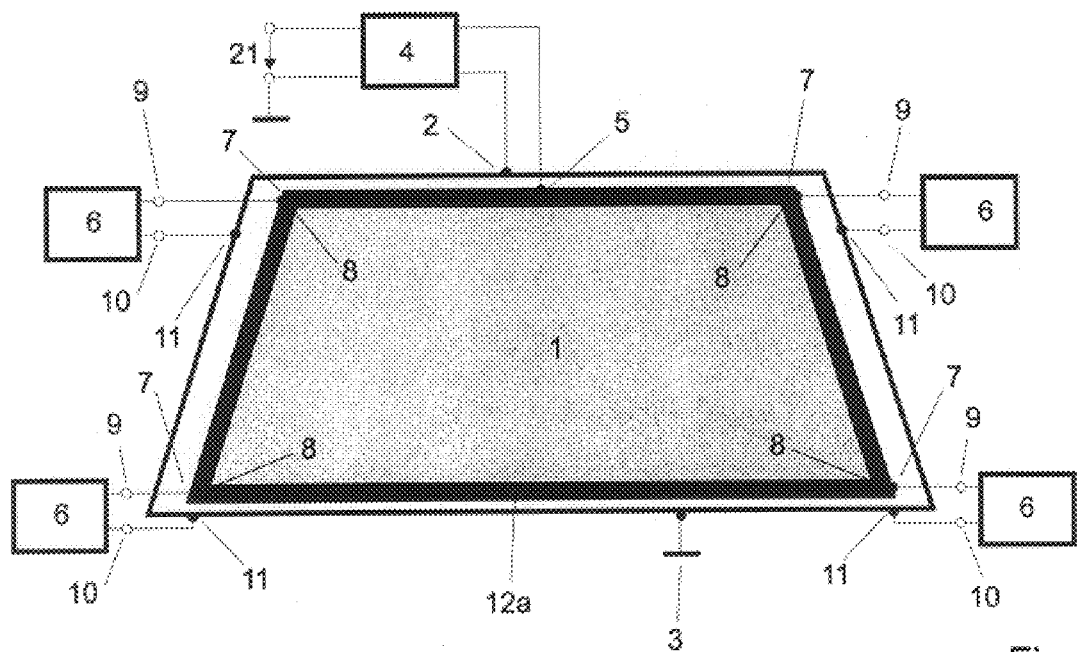

Conductive surface 1 is formed by a homogeneous conductive layer or by a net or lattice structure consisting of wire-shaped discrete conductors, or by a plurality of partial areas of surfaces. These surfaces as shown in FIG. 2, are conductively connected to each other in terms of high frequency, by edge conductors 12 extending around the entire conductive surface 1, forming a coherent and adequately conductive surface 1 in terms of high frequency. The surface has a substantially rectangular or trapezoidal shape conforming to the usual shape of car windows. For $$\underline{U}_I = \underbrace{\sum_{v=1}^{N} U_v \cdot e^{j(\psi_v + 2\pi l/\lambda \cdot \cos\varphi_v)} \cdot \underline{S}_{13}(\varphi_v)}_{\underline{U}_I(l)} + \underbrace{\frac{\underline{S}_{12} \cdot \underline{r}_2(\underline{Z}_2)}{1 - \underline{S}_{22} \cdot \underline{r}_2(\underline{Z}_2)} \cdot \sum_{v=1}^{N} U_v \cdot e^{j(\psi_v + 2\pi l/\lambda \cdot \cos\varphi_v)} \cdot \underline{S}_{23}(\varphi_v)}_{\underline{U}_{II}(l)} \qquad (1)$$

wherein the sum expressions $\underline{U}_I$ (l) and $\underline{U}_{II}$ (l) denote complex voltage contributions acting on gate I. These voltage contributions change strongly along the driving distance l and, because of the statistical regularity, each have a known level of fading which does not appear in the same location only, if the difference between $S_{13}(\phi v)$ and $S_{23}(\phi v)$ is adequate. This difference is achieved in the present invensolving the problem, a defined minimum size has to be required for conductive surface 1 so that none of its sides have a length shorter than $\lambda/10$ at the received frequency. Because of the predominantly capacitive effect of conductive surface 1, low resistance in terms of usual high-frequency conductors is not, necessarily required in this connection. It is sufficient that the surface resistance of a homogeneously conductive layer does not substantially exceed the value of 10Ω. In the case of a conductive surface 1 formed by discrete wire-shaped conductors, as embedded, for example in laminated glass panes in the form of heating wires, or as imprinted as heating conductors on rear window glass panes, the conductivity required is also achieved. Edge conductors 12 form the outer frame of conductive surface 1. This frame consists of either thin, wire-shaped conductors in the form of inductively high-resistance edge conductors 12*b* (FIGS. 5, 6), or with a conductive surface 1 formed by a homogeneously conductive transparent layer. These conductors may be provided on its edge without being specially formed. In order to produce a conductive surface 1 of this type, the coupling required between gates I and II and edge conductors 12, are in the form of low-resistance coupling conductors 12*a*. In order to avoid the inductively high-resistance effect of thin wire-shaped conductors, the edge conductor can be in the form of a flat, strip-like conductor having a width of at least 5 mm. This conductor is applied to the window glass pane. In the case of an inductively high-resistance edge conductor 12*b* with a round cross section, the conductor should have a diameter of not less than 4 mm. When realizing the low-resistance coupling conductor 12*a* on the edge of conductive surface 1, it is found that the later is not limited to straightness, but that the continuous length of the low-resistance coupling conductor 12*a* should be smaller than $\lambda/10$. This is shown in FIG. 1*b* by the connection with a coupling conductor 12*a* that extends around the corner of the conductive surface 1.

Conductive surface 1 is completely surrounded by a low-resistance coupling conductor 12*a*, which is connected to conductive surface 1. Up to four electronically controllable impedance networks 6 are wired to surface 1. Impedance networks 6 are preferably attached within the immediate proximity of one of corner points 7 of conductive surface 1 at an impedance connection point 8 on the low-resistance coupling conductor 12*a* on the one hand, and to the vehicle ground point 2 on the other. With a conductive surface 1 of the type shown, a special multitude of antenna signals 21 can be achieved with this attachment of the electronically controllable impedance networks 6. This is referred to in the following as diversity efficiency.

Particularly advantageous is the application of the invention to a heating field 20, which is attached to the rear window glass pane or the windshield of a motor vehicle as shown in FIG. 1*a*. The bus-bars 14 of the heating field shown in FIGS. 5 and 6 can be employed as low-resistance coupling conductors 12*a*. With the usual dimensions of a motor vehicle, the length of a vertically oriented bus-bar 14 is between 30 cm and 80 cm. In the frequency range of VHF radio broadcasting this corresponds with a relative wavelength of $\lambda/10$ to $\lambda/4$. Therefore, bus-bar 14 can form a low-resistance coupling conductor 12*a*.

Another embodiment of the invention is shown in FIG. 1*a*. A low-resistance coupling conductor 12*a* is extended along the lower edge of conductive surface 1, up to the horizontal center of the transverse dimension of the window pane 39. An electronically controllable impedance network 6 is mounted as shown in FIG. 14. In this case, the spacing between connection network 4 and electronically controllable impedance network 6 connected to the horizontal center of the heating field amounts to ¼ to ½ of the wavelength in the VHF-range.

Figure 3B:
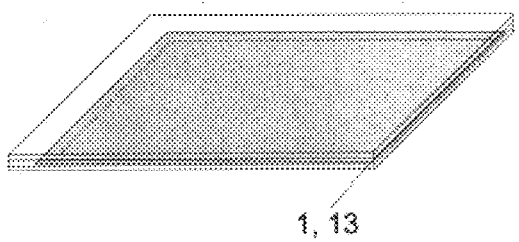

Referring to FIGS. 3*a*, 3*b* and 4, front window panes (or windshields) that are provided with a conductive coating 13 inhibiting infrared transmission are conductive surface 1 according to the invention. These coatings are applied either to the surface of the glass pane as shown in FIG. 3*a*, or embedded in the laminated glass as an intermediate layer as shown in FIG. 3*b*. According to the invention, the layer itself acts as low-resistance coupling conductor 12*a* in the marginal zone of this good conductive layer. In FIG. 4, the conductivity of the conductive coating is limited due to the required transparency, and thus the surface resistance is 3Ω to 10Ω. For these conductive surfaces 1, low-resistance coupling conductor 12*a* is in the form of a strip-like electrode 43 with high-frequency, low-resistance contact to conductive surface 1. Coupling can be accomplished either galvanically through contact with conductive coating 13, or in the form of strip-like electrode 43, which is capacitively connected to conductive coating 13.

Referring to FIG. 5, conductive surface 1 is formed by a heating field with heating conductor components 15 between two bus-bars 14. In addition to electronically controllable impedance network 6 connected at the lower left end of the heating field, a similar electronically controllable impedance network 6 is connected at the upper right edge of conductive surface 1. Because of the inductive effect of heating conductor components 15, and inductively high-resistance edge conductor 12*b*, the effective variability of antenna signals 21 in terms of diversity by wiring this system with different impedancies is narrowed down considerably.

As shown in FIG. 6, low-resistance coupling conductor 12*a* is continued on the lower edge of conductive surface 1 and connected, in terms of high frequency, to bus-bar 14 opposite connection network 4. Direct-current short-circuiting direct-current interruption 42. This substantially increases the influence of different impedances of electronically controllable impedance network 6 on the right-hand side on the received voltages tapped from connection network 4, and results in an increased diversity efficiency.

FIG. 7 shows a low-resistance coupling conductor 12*a* in a heating field with an inductively high-resistance edge conductor 12*b*. Vertical wire-shaped conductors 16 are mounted perpendicular to the direction of flow of heating dc 17 for the high-frequency connection between two or more horizontal heating conductor components 15. When mounted between points each having the same heating voltage potential, vertical wire-shaped conductors 16 do not lead to compensating currents and thus will not change the heating effect of connected heating conductor components 15. In terms of high frequency, connected heating conductor components 15 act as a low-resistance coupling conductor 12*a* within the meaning of the invention. Wire-shaped conductor components 15 are heated, and connected either galvanically or capacitively. In FIG. 7, the heating current is fed to bus-bars 14 by feed networks 18, which block HF-currents. In FIG. 8, the heating-current feed line is directly grounded to the vehicle ground 3 on bus-bar 14*b*.

Divided heating fields are frequently required in motor vehicle engineering. To create a conductive surface 1 that is effective in terms of high frequency, and dimensioned as large as possible, it is possible to connect bus-bars 14 of heating fields 20 with each other. Bus-bars 14 are disposed adjacent to one another, or one on top of the other, by means of high-frequency conducting two-pole 19, as shown in FIGS. 9 and 10. FIG. 9 shows the combination of two diversity systems with divided heating fields. With the help of high-frequency conducting two-poles 19, a through-extending low-resistance coupling conductor 12*a* is placed on both sides of conductive surface 1. With the help of electronically controllable impedance networks 6, which are mounted at the bottom ends of low-resistance coupling conductors 12*a*, antenna signals 21 are formed that are different in terms of diversity, especially with respect to connection networks 4 mounted at the upper end of low-resistance coupling conductor 12a. Antenna signals 21, available on two connection networks 4, are supplied to a receiver 30 via a diversity change-over switch 54. The diversity effect of the system consists in the different impedance wiring in electronically controllable impedance networks. 6, in left and right corner sites 7 on the lower edge of conductive surface 1, as well as in the different switching positions of effective impedance 50.

According to the embodiment of the invention shown in FIG. 10, an electronically controllable impedance network 6 is mounted instead of high-frequency conducting two-pole 19 as shown in FIG. 9. The diversity efficiency can be substantially increased by electronically controllable impedance networks 6 with respect to antenna signal 21, through different impedances in two heating fields 20 connecting bus-bars 14.

Each electronically controllable impedance network 6 has at least one control gate 22 for adjusting the effective impedance value Z between first HF-connection 9 and second HF-connection 10. By applying different control signals 21, different impedances Z become effective, and antenna signals 21 that are different in terms of diversity are provided on the output of connection network 4 due to the coupling, effect of low-resistance coupling conductor 12a.

The basic function of electronically controllable impedance network 6 is shown in FIG. 11a by an electronic switching element 24 and an impedance Z25.

FIG. 11b shows an embodiment with two digitally adjustable electronic switching elements 24 each having discrete switching conditions, and a reactance 25. With the help of the two control gates 22, it is possible to adjust three different impedance values with one impedance network 6 with suitable control. If an additional electronically controllable impedance network 6 is employed, as in FIG. 5, at the top-right, with two different switching conditions (high-resistance and low-resistance Z), four antenna signals 21 that are different in terms of diversity can be formed by virtue of the effect of low-resistance coupling conductor 12a. However, the diversity efficiency can be enhanced even further beyond this level if, as shown in FIG. 6, low-resistance coupling conductor 12a is extended up to the second electronically controllable impedance network 6. The adjusted combinations of impedance values set for the first and second electronically controllable impedance networks 6 read as follows:

| Combination No. | First Network | Second Network |
| --- | --- | --- |
| 1 | abt. 50 Ω inductively | high resistance |
| 2 | high resistance | high resistance |
| 3 | high resistance | low resistance |
| 4 | low resistance | low resistance |

FIG. 12a shows a diversity receiving system coupled to a receiver 30, with a diversity processor 31 for detecting and displaying reception interferences in antenna signal 21, or in a received signal 37 derived therefrom. A switching device 29, to which display signal 32 is supplied, and on whose output control signals 23 are formed, transmits controls signals to electronically controllable impedance networks 6 via control lines 34. Switching device 29 is activated when a reception interference occurs in antenna signals 21. A different (in terms of diversity) antenna signal 21 is formed on the output of connection network 4 by changing over (or reversing) the impedance value of at least one of electronically controllable impedance networks 6. In conjunction with diversity processor 31, the change of antenna signal 21 is continued until no interference is indicated by diversity processor 31.

Due to the strong coupling between antenna connection point 5 and impedance connection point 8, the source impedance with which connection network 4 is supplied changes when different impedance values are connected in electronically controllable impedance network 6.

FIG. 12b shows a digitally switchable adapter network 26 added to connection network 4. Adapter network 26 effects an impedance adaptation with each of the different switching conditions of electronically controllable impedance networks 6. This measure has no bearing on the directional effect of the antenna selected by the diversity processor. Digitally switchable adapter network 26 is preferably controlled with the help of a switching device 29 that produces the different switching conditions, in both electronically controllable impedance network 6, and digitally switchable adapter network 26. Switching device 29 is preferably stepped by diversity processor 29, which causes corresponding control signals 23 to be transmitted via control line 34 for controlling electronically controllable impedance networks 6, or the transmission of switching signals 33 for controlling digitally switchable adapter network 26.

FIG. 13 shows an AM antenna conductor 35 for receiving AM radio signals incorporated above conductive surface 1, and AM-amplifier 36 maintains a short connection to AM antenna conductor 35, which is present in connection network 4. The AM and FM amplifiers are jointly accommodated in one connection network 4. If only one connection network 4 is present at the left lower end of conductive surface 1, an efficient diversity antenna system can be realized with three different (in terms of diversity) antenna signals 21. By employing an additional electronically controllable impedance network 6, an additional impedance connection point 8 with a vehicle ground point 11 located adjacent to this impedance connection point is formed in the lower center third part of the longitudinal expanse of conductive surface 1. Connected thereto is another electronically controllable impedance network 6 as shown in FIG. 14. The second electronically controllable impedance network 6 is adequately spaced apart from first electronically controllable impedance network 6.

In FIG. 15, to realize ground points 11 or vehicle ground connection point 2, a strip-like conductor 38 is attached along the edge of window pane 39, at least within the zone of the connection points. The length and width of the conductor are selected so that the conductor forms a sufficiently large capacity with the conductive window edge of the body of the vehicle, and an adequately low-resistance capacitive connection to vehicle ground 3 is obtained. Electronically controllable impedance network 66 is connected to the conductor via impedance connection point 8, and connection network 4 is connected via antenna connection point 5. Additionally, thinner conductors 34 and 44 are on window pane 39 as seen in FIG. 15. These conductors may serve as control line 34, and also as current supply line 44. Control lines 34 are employed for the signals required for controlling the impedance conditions in an electronically controllable impedance network 6. Control lines 34 transmit control signals 23 to electronically controllable impedance networks 6. Control lines 34 are in the form of conductors or multiple conductors imprinted on the glass. The switching functions in electronically controllable impedance networks 6 are preferably effected by electronic switching elements 24, which are in the form of electronic switching elements having binary switching conditions. Switching device 29 is preferably contained in connection network 4, and control signals 23 are directly suited for opening and closing the switching diodes (e.g. in FIG. 11b).

FIG. 16 shows a system having targeted control of an electronically controllable impedance network 6. A code generator 41 is supplied for generating control signals 23 in the form of a carrier-based digital address signal. The address signal contains the information for adjusting all electronically controllable impedance networks 6 and is jointly supplied to the impedance networks via conductive surface 1. With the help of a decoding circuit 40 in each electronically controllable impedance network 6, the signals required for setting electronic switching elements 24 are generated by the circuit, and supplied to electronic switching elements 24.

In addition to control line 34, a current supply line 44 can be supplied in the form of a printed conductor. To produce the binary conditions in electronic switching elements 24, a dc supply voltage is required for adjusting the pass-through or blocking conditions. Direct-current voltages applied to printed conductors that are printed adjacent to each other on the window glass are subjected to the risk of migration. These dc voltages alter the edges of the printed conductors because of electrolytic action on mist-covered or soiled window panes, so that conductive connections may be established between originally separated conductors with small spacings. This effect is avoided because the energy for producing the switching conditions in the electronically controllable impedance networks 6 is supplied, as shown in FIG. 17, with the help of an ac supply voltage on current supply line 44. An inverter 45 is contained preferably in connection network 4, inverter 45 being connected to the voltage supply and supplying on its output, an ac supply voltage 47. A rectifier 46 is present in electronically controllable impedance networks 6 for providing the required dc supply voltage 48 for producing the switching conditions of electronic switching elements 24. In this connection, it is necessary to keep ac supply voltage 47 adequately pure spectrally to avoid interference on the antenna system.

In FIG. 18, the number of conductors employed as control line 34 and current supply line 44 is reduced by double utilization in that both ac supply voltage 47 and control signals 23 are transmitted via this conductor from connection network 4 to electronically controllable impedance network 6. A filter 49 is employed in electronically controllable impedance network 6 for separating the signals.

FIG. 19 shows a representation of an electronically controllable impedance network 6 connected via impedance connection point 8, and an adjacent vehicle ground point 11 to conductive surface 1. Control signals 23 are transmitted to impedance network 6 via a control line 34, and electronically controllable impedance network 6 is supplied with current via a current supply line 44 in the form of an ac supply voltage 47.

FIG. 20 shows the effect of an impedance on a defined position on edge conductor 12 with the help of an impedance circuit located in another site, via a connecting high-frequency line 51. An impedance Z present in the left lower corner site 7 of conductive surface 1, loads connection point 8 with effective impedance 50 via a high-frequency line 51 extending parallel, with the lower window edge, connection point 8 being located at its right-hand end. The impedance Z is selected in this connection so that the desired antenna signals 21 are different from each other in terms of diversity, and adjust on connection network 4. A remote effect is utilized so that it is possible with the help of only one single structural unit, as in FIG. 21 in the form of the electronically controllable impedance network 6, to effect both a different impedance load applied to impedance connection point 8 in the horizontal center of window pane 39, and to impedance connection point 8 in the left lower corner 7 of conductive surface 1 as well. Different impedance loads, which take place at the lower end of bus-bars 14, if connection network 4 is connected to the top end of bus-bars 14, lead to good diversity efficiency, especially in connection with horizontal polarization of the received waves. Vertical conductors 53 in the zone of the center of conductive surface 1 are found to be particularly advantageous for vertical polarization. The application of alternating effective impedances 50 consequently leads to an increase in the diversity efficiency for vertical polarization components.

High-frequency line 51, shown in FIG. 20 in the form of a coaxial cable, can be advantageously realized with a printed conductor 52 parallel with the conductive window edge (vehicle ground 3)in the form of an non-symmetrical coplanar line, so that high-frequency line 51, control line 34, and current supply line 44 are in the form of printed lines as shown in FIG. 21. To enhance the electrical coupling between antenna connection point 5 and impedance connection point 8 in the lower center, a low-resistance coupling conductor 12a is installed. Low-resistance coupling conductor 12a is attached from the left lower corner of conductive surface 1, and extends up to the vertical center of the vehicle window glass pane, and is galvanically connected to vertical conductor 53. A required dc interruption signal is attained with a capacitor 42 located in electronically controllable impedance network 6. It is possible to produce a highly effective antenna diversity system that exclusively consists of the glass pane with printed conductors, connection network 4 and a single structural unit in which electronically controllable impedance networks 6 are accommodated. With the simplified design of both connection network 4 and the structural unit containing electronically controllable impedance networks 6, an antenna system can be constructed having a high efficiency and at low cost, for receiving a multitude of antenna signals 21 that are different from one another in terms of diversity.

Accordingly, while several embodiments of the present invention have been shown and described, it is obvious that many changes and modifications may be made thereunto without departing from the spirit and scope of the invention.

What is claimed is:

1. A diversity antenna for a diversity antenna system coupled to a radio receiver (30) in a vehicle having a vehicle ground, and a substantially rectangular window pane with opposed edges comprising:

a plurality of conductors applied to the window pane forming a high-frequency conductive surface (1);

at least one edge conductor (12) having a minimum length of $\lambda/10$ disposed along an edge of said conductive surface (1) and insulated from the vehicle ground (2);

a low resistance coupling conductor (12a) coupled to said at least one edge conductor (12) having a continuous length of at least $\lambda/10$ and comprising;

an antenna connection point (5) disposed on said low resistance coupling conductor (12a); and an impedance connection point (8) disposed on said low resistance coupling conductor (12a) at a distance of at least $\lambda/10$ from said antenna connection point (5);

only one connection network (4) coupled to said antenna connection point (5) and the vehicle ground (2); and at least one electronically controllable impedance network (6) coupled to said impedance connection point (8) and to the vehicle ground point (11);

wherein said controllable impedance network (6) varies the impedance of the antenna so that different diversity antenna signals (21) are produced at the output of said connection network (4).

2. The diversity antenna according to claim 1, wherein said low-resistance coupling conductor (12a) completely surrounds said conductive surface (1), and wherein said at least one impedance network comprises four impedance networks (6), and wherein an impedance connection point (8) is formed on said coupling conductor (12a) directly within the proximity of each of the corner points (7) of the window pane, with one connection of each of said controllable impedane networks (6) being connected to each of said impedance connection points (8), and the other connection of each of said impedance networks (6) being connected to an adjacent vehicle ground connection point.

3. The diversity antenna according to claim 1, wherein the dimension of the longest edge conductor (12) of said conductive surface (1) equals $1/4^{th}$ to $1/2$ of the operational wavelength of the received frequency.

4. The diversity antenna according to claim 3, wherein the dimension of the shortest edge conductor (12) of said conductive surface (1) equals $1/10^{th}$ to $1/4^{th}$ of the operational wavelength of the received frequency.

5. The diversity antenna according to claim 1, wherein said conductive surface (1) applied to the surface of the window pane comprises a transparent conductive coating (13) of high conductivity and that said low-resistance coupling conductors (12a) are formed by the high conductivity of said conductive coating (13).

6. The diversity antenna according to claim 1, wherein said conductive surface (1) of the window pane comprises a conductive layer embedded in the glass and that said low-resistance coupling conductors (12a) are formed by the high conductivity of said conductive coating (13).

7. The diversity antenna according to claim 5, wherein said conductive coating (13) is provided with limited conductivity having a surface resistance of 3 to 10 ohms due to the required transparency, and further comprising strip-like electrodes (43) having high-frequency, low-resistance contact to said conductive surface (1) and disposed along the edge of said conductive surface for forming said low-resistance coupling conductors (12a).

8. The diversity antenna according to claim 1, wherein said conductive surface (1) comprises at least one heating field (20) disposed in the window pane, and further comprises at least two bus-bars (14) disposed on the side surfaces of the window pane for feeding heating current to said at least one heating field (20), and conductor components (15) disposed between said bus-bars (14), said conductor components (15) being heated, and wherein said low-resistance coupling conductors (12a) are formed by said bus-bars (14).

9. The diversity antenna according to claim 8, wherein said conductor components (15) to be heated comprise wires embedded in the window pane, and that inductively highly resistive edge conductors (12b) are coupled to said conductor components (15), said conductor components being located on the edge of said conductive surface (1).

10. The diversity antenna according to claim 8, wherein said conductor components (15) comprise conductors imprinted on the window pane.

11. The diversity antenna according to claim 8, comprising at least one low-resistance coupling conductor (12a) with a serially capacitive direct-current separation (42), for providing a high-frequency, low-resistance coupling conductor (12a) between said two bus-bars (14).

12. The diversity antenna according to claim 9, comprising at least one wire-shaped conductor (16) disposed perpendicular to the direction of flow of a dc heating current (17) so that said conductors are coupled to at least two of said wire-shaped conductor components (15) to be heated for providing a high-frequency, low-resistance coupling conductor (12a) from conductor components (15) in the form of wires perpendicular to the direction of flow of said dc heating current (17).

13. The diversity antenna according to claim 8, comprising a feeder network (18) inserted in the heater-current feed lines on said bus-bars (14) for blocking HF-currents.

14. The diversity antenna according to claim 8, comprising:

a current feeder network (18) for blocking HF-currents, and disposed in a first heating current feed line of a first bus-bar (14a) for feeding current to said bus-bar (14a); and a second heating current feed line connected to a second bus-bar (14b) and connected to a vehicle ground (3); wherein said electronically controllable impedance network (6) is connected to said first bus bar (14a) adjacent to at least one of its corner points (7), wherein said at least one edge conductor has a longitudinal expanse having a right, a left and a center third and wherein said antenna connection point (5) is disposed in said center third of said longitudinal expanse of one of said two longer edge conductors for connecting to said connection network (4).

15. The diversity antenna according to claim 8, wherein said at least one heating field (20) comprises first and second heating fields for providing a horizontal direction of flow of said dc heating current (17), said heating fields (20) being arranged one on top of the other and electrically separated from each other, wherein said adjacent bus-bars (14) of said heating fields (20) are disposed one on top of the other; and a high-frequency conducting two-pole circuit (19) for connecting said adjacent bus-bars (14) to each other forming said conducting surface (1) that is effective at high frequencies, and has the largest possible surface area.

16. The diversity antenna according to claim 8, wherein said at least one heating field (20) comprises first and second heating fields for providing a horizontal direction of flow of said dc heating current (17), said heating fields (20) being arranged one on top of the other and electrically separated from each other, and wherein said adjacent bus-bars (14) of said heating fields (20) are disposed one on top of the other, and wherein said electronically controllable impedance network (6) connects said adjacent bus-bars (14) to each other to form said conducting surface (1) that is effective at high frequencies and has the largest possible surface area.

17. The diversity antenna according to claim 8, wherein said controllable impedance network (6) comprises:

at least one control gate (22) for adjusting the effective impedance value between a first HF-connection (9) and a second HF-connection (10), so that by applying different control signals (23) to said gate (22) different antenna signals (21) in terms of diversity are formed on the output of said connection network (4).

18. The diversity antenna according to claim 8 wherein said impedance network (6) comprises:

at least one control gate (22) having one input coupled to one of said bus-bars and the other input grounded to the vehicle;

at least one digitally adjustable electronic switching element (24) coupled to said bus-bar input of said gate (22) and having discrete switching conditions; and at least one reactance (25) coupled to said switching element (24) and having adjustable discrete impedance values wherein the discrete values are adjusted by applying digital control signals (23) to said input control gate (22) of said network (6).

19. The diversity antenna according to claim 1 comprising:

a diversity processor (31) coupled to the output of said connection network (4) for detecting and indicating reception interferences in said antenna signal (21) at the output of said network (4), or received signals (37) derived therefrom, and producing at its output a display signal (32); and a switching device (29) coupled to the output of said diversity processor (31) for receiving said display signal (32), and producing at its output control signals (23), transmitted to said impedance network (6) via control lines (34) so that upon the occurrence of a reception interference in said antenna signal (21), an antenna signal that is different in terms of diversity is formed on the input of said connection network (4) by the impedance value of at least one of said electronically controllable impedance networks (6), wherein said antenna signal (21) continues to change until no interference is indicated by said diversity processor (31).

20. The diversity antenna according to claim 19, wherein said connection network (4) comprises a loss-free, digitally switchable adaptation network (26) for coupling the impedance present under the different switching conditions of the electronically controllable impedance networks (6) at said antenna connection point (5) to an antenna line (27) leading to the receiver (30), and an antenna amplifier (28) disposed in said connection network (4) and coupled to said adaption network (26) so that switching signals (33) for controlling said digitally switchable adaptation network (26) are formed in said switching device (29) and transmitted to said adaptation network (26).

21. The diversity antenna according to claim 8, wherein said antenna connection point (5) for connecting said connection network (4) is formed on the upper end of one of said two bus-bars (14), and wherein a first impedance connection point (8) for connecting a first electronically controllable impedance network (6) is formed on the lower end of said bus-bar, and a second impedance connection point (8) is formed on the upper end of said other bus-bar, for connecting a second electronically controlled impedance network (6), and that said first electronically controllable impedance network (6) is designed for digitally adjusting three discreet impedance valves, and said second electronically controllable impedance network (6) is designed for digitally setting two discrete impedance values.

22. The diversity antenna according to claim 21, wherein a total of four different antenna signals (21) in terms of diversity are formed by digitally controlling said impedance networks (6), and wherein adjusted combinations of impedance values read for said first and second impedance networks (6) are as follows:

| Combination No. | First Network (6) | Second Network (6) |
| --- | --- | --- |
| 1 | approx. 50 ohms inductive | high resistance |
| 2 | high resistance | high resistance |
| 3 | high resistance | low resistance |
| 4 | low resistance | low resistance |

23. The diversity antenna according to claim 19, wherein said conductive surface (1) comprises:

an AM antenna conductor (35) for receiving AM radio signals disposed on surface (1), and wherein said connection network (4) includes an AM amplifier (36) coupled with a short connection to said AM antenna conductor (35); and a FM antenna conductor disposed adjacent to and below said AM antenna conductor (35) on surface (1) and coupled to said impedance network (6).

24. The diversity antenna according to claim 23, comprising an additional impedance connection point (8) located in the center third of the longitudinal expanse of said conductive surface (1), a vehicle ground point (11) disposed adjacent to said impedance connection point (8) formed on at least one of said two longer edge conductors (12), said connection point (8) being connected to said electronically controllable impedance network (6).

25. The diversity antenna according to claim 24, comprising a strip-like conductor (38) disposed on the window pane for providing vehicle ground points (11) and the vehicle ground connection point (2) along the edge of the window pane, said conductor and the edge of the window of the body of the vehicle jointly forming an adequately large capacitance, so as to provide a capacitive connection to the ground of the vehicle.

26. The diversity antenna according to claim 25, wherein said strip-like conductor includes control lines (34) transmitting said control signals (23) to said electronically controllable impedance networks (6), said control lines being multiple conductors imprinted on the window pane.

27. The diversity antenna according to claim 26, wherein said electronic switching elements (24) comprise switching diodes with binary switching stages, and said switching device (29) contained in the connection network (4) provides control signals (23) for directly opening and closing said switching diodes.

28. The diversity antenna according to claim 26, comprising a code generator (41) for generating said control signals (23) in the form of a carrier-supported digital address signal, said address signal containing the information for adjusting all of said electronically controllable impedance networks (6), said information being jointly supplied to said signal via said conductive surface (1), and wherein said impedance networks (6) further comprise a decoding circuit (40) for generating the signals required for adjusting said electronic switching elements (24).

29. The diversity antenna according to claim 27, comprising a current supply line (44) imprinted on said window pane (39) and that the current supply required for blocking and passing conditions of said electronic switching element (24) is passed to said electronically controllable impedance network (6) via said current supply line (44).

30. The diversity antenna according to claim 29, comprising:

an inverter (45) disposed in said connection network (4) for generating an ac supply voltage (47) across said current supply line (44) for avoiding migration effects, said ac supply voltage (47) having an average time valve that is negligible with respect to the development of such effects; and a rectifier (46) disposed in said controllable impedance network (6) for generating a dc supply voltage (48) for blocking an passing conditions of said electronic switching element (24).

31. The diversity antenna according to claim 1, comprising a high frequency line (51) disposed along the edge of the window pane and connected to said high-frequency line for wiring an impedance Z between said impedance connection point (8) and said vehicle ground point (11) having an effective impedance (50).

32. The diversity antenna according to claim 31, wherein said high-frequency line (51) comprises a conductor (52) imprinted on the window pane, said conductor (52) is disposed in parallel with said vehicle ground (3), and said dc interruption (42) is located between said bus-bar (14) and said low-resistance coupling conductor (12a) in said controllable impedance network (6) with the components realizing said impedance Z.

33. A diversity antenna system having "N" antennas, where N>1, wherein the antennas are coupled to at least one radio receiver (30) in a vehicle having a substantially rectangular window pane with opposed edges and a vehicle ground, each antenna comprising:

a plurality of conductors applied to the window pane forming a high-frequency conductive surface (1);

at least one edge conductor (12) having a minimum length of $\lambda/10$ disposed along a rectangular edge of the window pane and insulated from the vehicle ground (2);

a low resistance coupling conductor (12a) coupled to said at least one edge conductor (12) having a continuous length of at least $\lambda/10$ and comprising;

an antenna connection point (5) disposed on said low resistance coupling conductor (12a); and an impedance connection point (8) disposed on said low resistance coupling conductor (12a) at a distance of at least $\lambda/10$ from said antenna connection point (5);

only one connection network (4) coupled to said antenna connection point (5) and the vehicle ground (2); and at least one electronically controllable impedance network (6) coupled to said impedance connection point (8) of each antenna and to the vehicle ground point (11);

wherein said at least one controllable impedance network (6) varies the impedance of each antenna so that different diversity antenna signals (21) are produced at the output of said connection network (4).

\* \* \* \* \*